United States Patent [19]
Gofke

[11] 3,815,194
[45] June 11, 1974

[54] CUTTING TOOL FOR PEELING MACHINES
[75] Inventor: Alfons Gofke, Solingen, Germany
[73] Assignee: The Kieserling & Albrecht, Solingen, Germany
[22] Filed: Sept. 22, 1972
[21] Appl. No.: 291,267

[30] Foreign Application Priority Data
Sept. 28, 1971 Germany............................ 2148318

[52] U.S. Cl.......................................... 29/96, 82/20
[51] Int. Cl................................................ B26d 1/00
[58] Field of Search........ 29/96, 95, 97, 567; 82/20, 82/1 C

[56] References Cited
UNITED STATES PATENTS
2,710,442  6/1955  Ranous................................... 29/96
3,422,706  1/1969  Lunsford................................. 29/95

FOREIGN PATENTS OR APPLICATIONS
1,068,974  12/1959  Germany................................ 29/96
616,204    1/1949   Great Britain....................... 82/1 C Primary Examiner—Leonidas Vlachos

[57] ABSTRACT

Cutting tool for peeling machines having main and secondary cutting edges of approximately the same length which enclose an angle of 170° to 178°. A chip-guidance step is formed into the upper surface of the cutting tool along the length of both cutting edges. The chip-guidance step has its length perpendicular to a line bisecting the angle enclosed by the main and secondary cutting edges.

4 Claims, 2 Drawing Figures

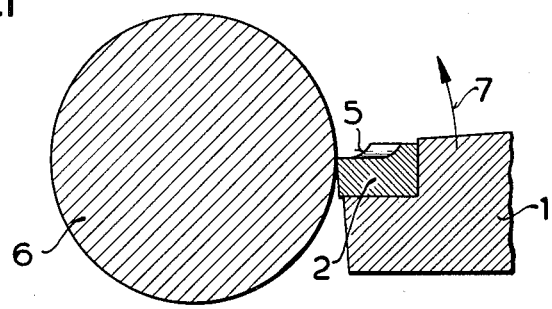
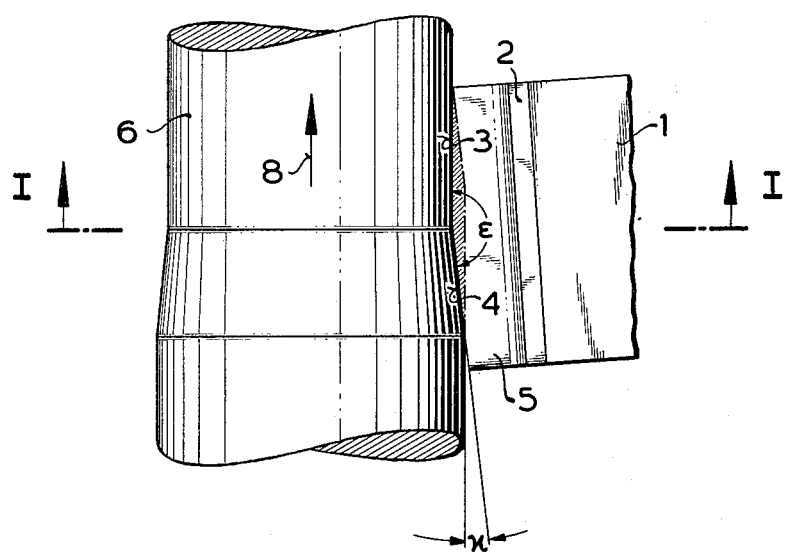

CUTTING TOOL FOR PEELING MACHINES

The invention relates generally to a cutting tool for metal working machines and particularly to a cutting tool adapted for peeling hot-rollled elongated material in a peeling machine.

In the prior art, cutting tools of this general nature are already known in which the secondary and main cutting edges are of approximately the same length. However, in these tools the secondary cutting edge frequently has no chip-guidance step or, this step is merely a continuation of the chip-guidance step at the main cutting edge, and it does not extend over the whole length of the secondary cutting edge. The angle which the main cutting edge forms with the surface of the workpiece, hereinafter referred to as the setting angle, "$H$", is in the range of 15° to 30° so that the angle enclosed by the main and secondary cutting edges, hereinafter referred to as the nose or apex angle "$\epsilon$", is 150° to 165°. These cutting tools have also been used to peel narrow-tolerance workpieces where a relatively small depth of cut or chip depth is used, for example 0.15 mm in the case of a workpiece 15 mm in diameter, while the feed per cutting edge and per revolution of the workpiece is relatively heavy, for example between 2 and 2.5 mm. This results in cutting action in which most of the cut is made by the secondary cutting edge and a heavy workpiece feed rate is used.

In the peeling of workpieces having wide tolerance ranges, for example, hot-rolled materials or continuous castings, chip depths of up to 3 mm may be necessary. In these cases, the feed per cutting tool and per revolution is about fifteen times the chip depth and the secondary cutting edge will be longer than the main cutting edge if the angle "$H$" is between about 15° and 30°. However, this causes high specific cutting pressure in the region of the relatively short main cutting edge and unacceptable heating which greatly reduces the life of the tool.

It is the primary object of the present invention to provide a cutting tool of improved construction in which the heat generated by the cutting action is more efficiently dissipated, and the heating of the tool and the specific cutting pressure being reduced to such an extent that the cutting tool has a more satisfactory work life and the rate of metal removal may be substantially increased.

In order to attain the above noted objectives there is provided and the present invention resides in a cutting tool for peeling elongated metal workpieces. The tool includes a tool holder and a cutting member or tool rigidly attached to the tool holder with the cutting tool being provided with main and secondary cutting edges. The cutting tool has a chip-guidance step formed substantially along the entire length of the cutting edges.

Another aspect of the present invention resides in the provision of a cutting device of the type described above in which the cutting edges are of approximately the same length and enclose an angle of between 170° and 178°; with the main cutting edge forming an angle of between 2° and 10° relative to the feed axis of the workpiece.

A still further aspect of the present invention resides in providing a cutting device of the type noted above wherein the chip-guidance step is constructed with its longitudinal direction at right angles to a line bisecting the angle enclosed by the cutting edges.

For a better understanding of the present invention, together with other and further objects thereof, reference is had to the following description taken in connection with the accompanying drawings, and its scope will be pointed out in the appended claims.

In the drawing:

FIG. 1 is a fragmentary cross-sectional view of a cutting tool and a workpiece taken along line I—I of FIG. 2; and FIG. 2 is a plan view of part of the workpiece and the cutting tool.

Referring now to the drawings, there is shown a tool holder 1 provided with a recess in the periphery thereof to receive a cutting tool 2 which is secured to holder 1, for instance by brazing. The tool 2 is arranged for facing a typical workpiece 6. The tool 2 has a secondary cutting edge 3 and a main cutting edge 4 which enclose an apex angle of between 170° and 178° designated "$\epsilon$". The main cutting edge 4 of the tool 2 forms a setting angle, or entry angle of between 2° and 10° designated "$H$", with reference to the surface normally the longitudinal axis of the workpiece 6 when the workpiece is fed to the cutting position along a predetermined axis. The cutting tool 2 has a chip-guidance step 5 ground into its upper surface proximate to the cutting edge with its length at right angles to a line bisecting the apex angle "$\epsilon$".

In operation, the tool holder 1, with the tool 2, is rotated in the direction of arrow 7 while the non-rotating workpiece 6 is advanced in the direction of arrow 8. The workpiece 6 may be advanced somewhat less than the length of the secondary cutting edge 3 during one revolution of the tool 2 so that the cuts on the workpiece 6 definitely overlap. With an arrangement of four, six, or more cutting tools in a rotatable cutting head, the feed of the workpiece may also be increased by a factor of four, six, or more, as applicable. When the r.p.m. of the cutter head is matched to the cutting speed of the material in the workpiece and the tools, as well as to the diameter of the workpiece, a very high rate of metal removal may be attained.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A cutting device for peeling elongated metal workpieces comprising:
   a tool holder;
   a cutting tool rigidly attached to said tool holder having main and secondary cutting edges;
   a chip-guidance step formed substantially along the length of the entire said cutting edges and interacting therewith; and
   wherein the workpiece is fed to said tool along a predetermined axis, and said main cutting edge forms an angle of between 2° and 10° relative to said feed axis.

2. A cutting device for peeling elongated workpieces according to claim 1, wherein said cutting edges are of approximately the same length and enclose an angle of between 170° and 178°.

3. A cutting device for peeling elongated workpieces according to claim 1, wherein said chip-guidance step has its longitudinal direction at right angles to a line bisecting the angle enclosed by the said cutting edges.

4. A cutting device for peeling elongated workpieces according to claim 1, wherein said chip-guidance step is positioned to co-extend with the direction of feed of the workpiece.

* * * * *